Dec. 21, 1965   A. P. SCHNYDER   3,224,606
PRESSURE SEALING VALVE
Filed May 10, 1962   3 Sheets-Sheet 1

INVENTOR
AUXILIUS P. SCHNYDER
BY
ATTORNEY

INVENTOR
AUXILIUS P. SCHNYDER
BY
ATTORNEY

Dec. 21, 1965    A. P. SCHNYDER    3,224,606
PRESSURE SEALING VALVE
Filed May 10, 1962    3 Sheets-Sheet 3
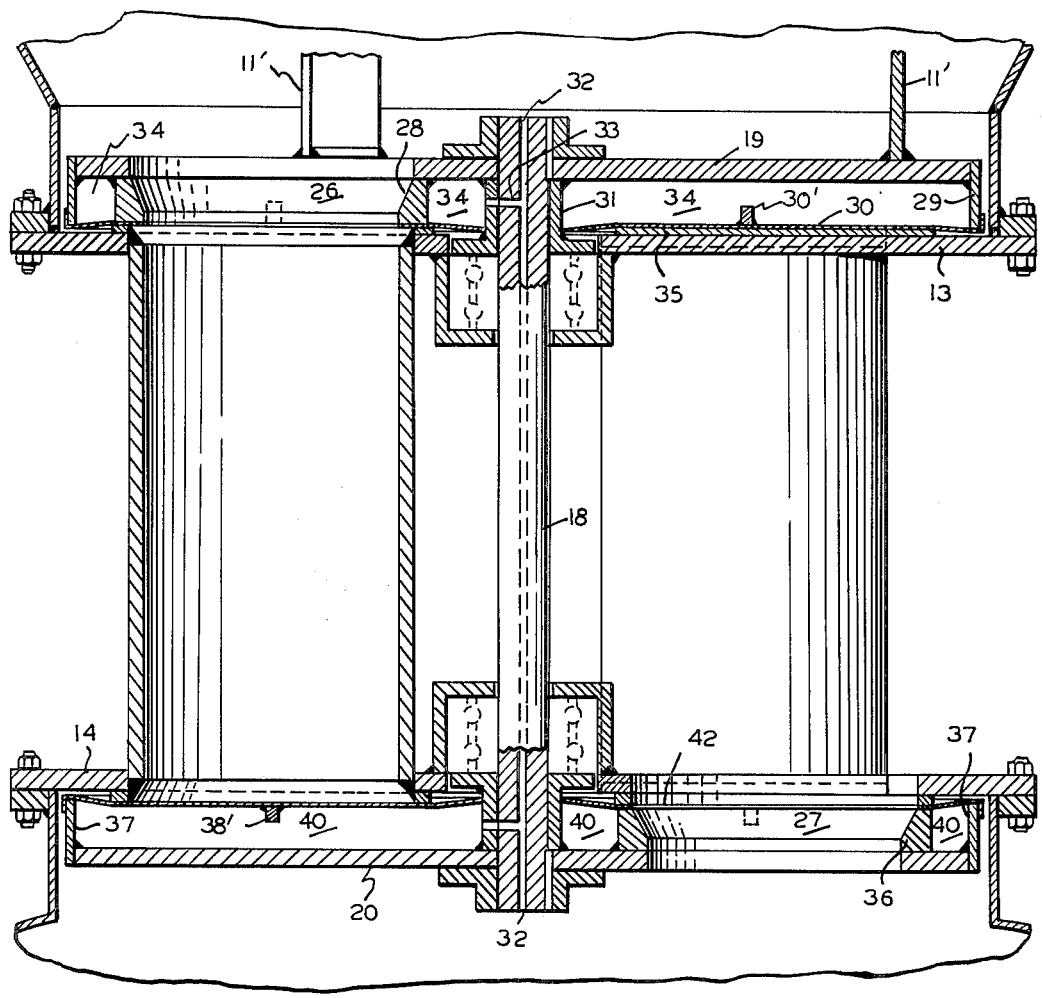
FIG. 5
INVENTOR
AUXILIUS P. SCHNYDER
BY
ATTORNEY

United States Patent Office 3,224,606
Patented Dec. 21, 1965

3,224,606
PRESSURE SEALING VALVE
Auxilius P. Schnyder, Bogota, N.J. (% The Lummus Company, 385 Madison Ave., New York 17, N.Y.)
Filed May 10, 1962, Ser. No. 193,745
9 Claims. (Cl. 214—17)

The present invention relates to an improved material handling and metering device. More particularly, the presnet invention relates to an improved valve assembly including rotatable inlet and outlet plates for introducing wood chips into a pressurized cooking zone within a continuous digester.

Many feed mechanisms have been designed for introducing chips into a digester. In practice most of these mechanisms had serious drawbacks. Among the common types of chip feed mechanism are those which compress the chips into an impervious plug by means of either a plunger or a screw. The compression of the chips into such a plug may seriously damage the mechanical properties of the fibre which is obtained after digestion. Rotary bucket or star valves are also used. However, these mechanisms suffer from leakage because of the clearances required for operation. Furthermore, as the empty buckets return to the chip filling station, air may be introduced into the digester along with the chips, and steam released to the atmosphere. It has also been proposed to utilize a rotary disk having a plurality of chip passageways therein as a feed means to a digester. One such mechanism includes spaced non-rotatable plates provided with inlet and outlet apertures, respectively, and a rotatable disk member having a plurality of axial chip passages therein between the plates. Each chip passageway receives chips when it is under the inlet aperture and discharges the chips when the passageway is aligned with the outlet aperture in the bottom plate. During the cycle, cooking liquor may be introduced into the chip passageways to assist in the chip discharge.

In contrast to such known mechanisms, the rotary valve assembly of the present invention comprises spaced rotatable inlet and outlet plates provided with an inlet aperture and an outlet aperture, respectively, and a stationary member between said rotatable plates and sealed with respect thereto. The stationary member is provided with a plurality of axially extending circumferentially spaced chip passageways extending therethrough. Sealing means including membrane means are provided to assure a tight seal between the rotating plate members and the stationary member. Conduit means interconnect upper portions of the chip passageways with the digester so that the full digester pressure may be admitted to the chip passageways adjacent the discharge position for assisting in pressure equalization and for aiding in the discharge of the chips from the passageways.

Accordingly, it is an object of the present invention to provide an improved material handling device.

Another object of the present invention is to provide an improved device for metering wood chips into a pressurized cooking zone within a continuous digester.

Another object of the present invention is to provide an improved rotary valve assembly.

Still another object of the present invention is to provide improved means for pressure equalization within of a valve assembly.

A further object of the present invention is to provide improved means for pressure eyualization within a feed device to a continuous digester.

These and other objects, features and advantages of the present invention will become more apparent from the following description when taken in connection with the accompanying drawing wherein:

FIGURE 5 is a vertical sectional view along line 5—5 of FIGURE 3.

Figure 1:
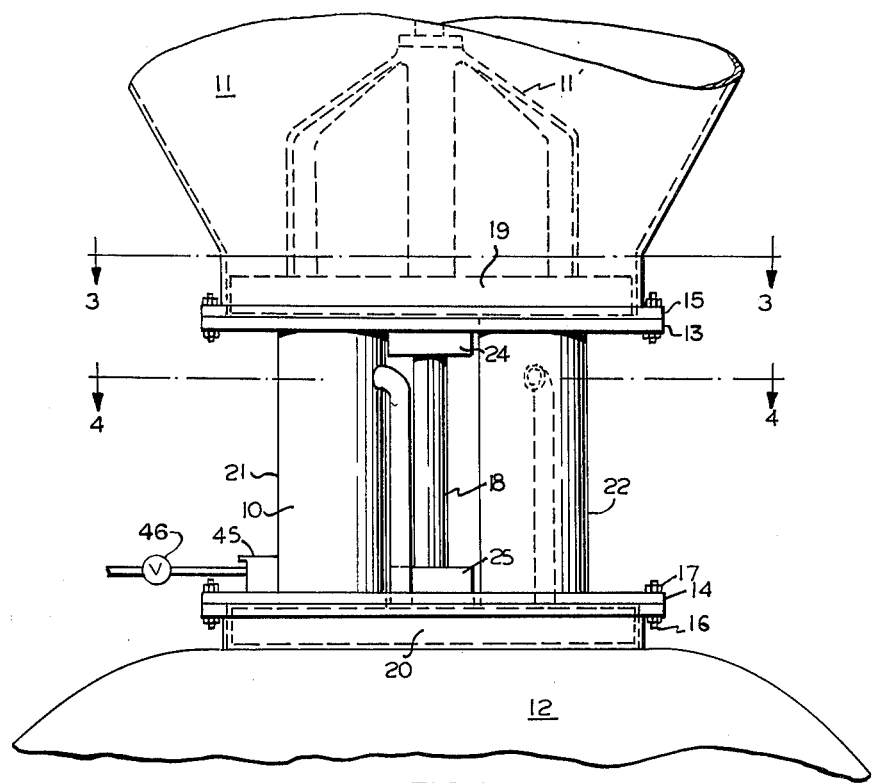
FIGURE 1 is an elevational view of one embodiment of an improved material handling device in accordance with the present invention.

Referring now to the drawing, and in particular to FIGURE 1, the illustrative embodiment shown therein comprises a valve assembly generally designated by reference numeral 10 feeding chips from a chip hopper 11 into a digester 12. Valve assembly 10 has an upper flange 13 and a lower flange 14 ridgidly connected respectively to a flange 15 of hopper 11 and a flange 16 of digester 12 by bolts 17. A centrally located rotating shaft 18 extends through a rotatable inlet plate 19 adjacent the bottom of hopper 11 and a rotatable outlet plate 20 adjacent the digester 12. Shaft 18 is suitably keyed to the plates 19 and 20 so as to impart rotation thereto. A drive bracket 11' is positioned within hopper 11 interconnecting shaft 18 and the inlet plate 19 to impart stability to the plate while simultaneously functioning to sweep the chips within the bottom of hopper 11. The stationary portion of valve assembly 10 includes peripherally spaced open ended chip feed passageways 21, 22 shown in FIGURE 1 and 23 shown with passageways 21 and 22 in FIGURE 4 extending between inlet plate 19 and outlet plate 20. Suitable upper and lower bearing assemblies 24 and 25 surround shaft 18 adjacent flanges 13 and 14.

Figure 3:
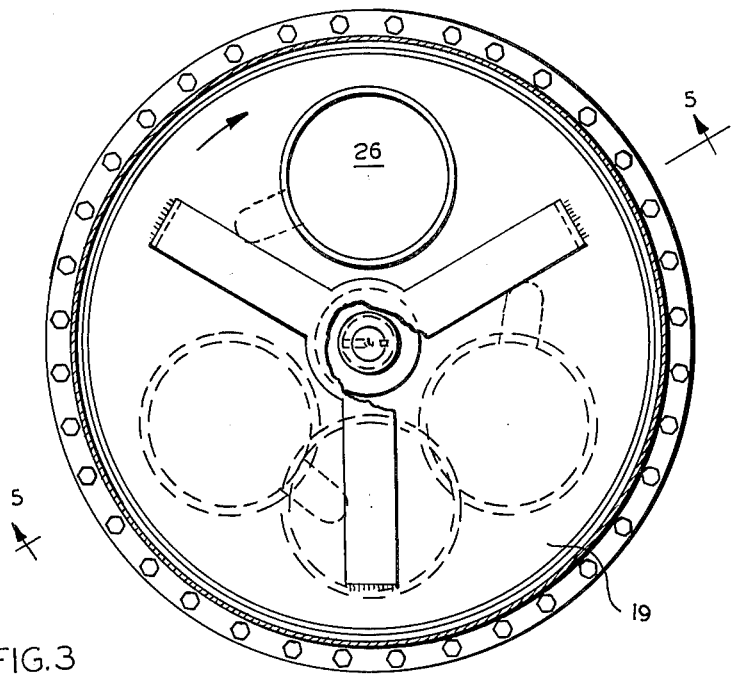
FIGURE 3 is a horizontal sectional view along the line 3—3 of FIGURE 1.
Figure 4:
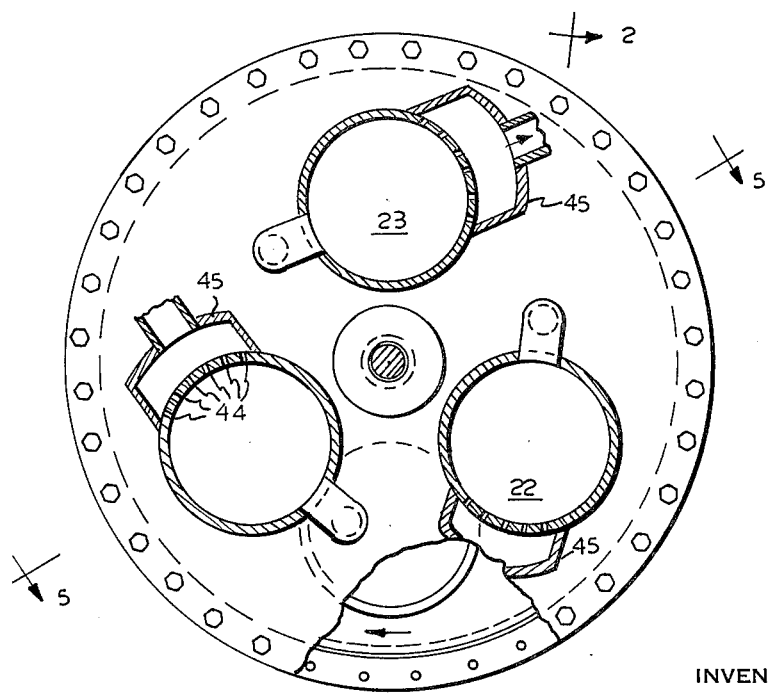
FIGURE 4 is a horizontal sectional view along the line 4—4 of FIGURE 1.

Referring now to FIGURES 3 and 4, inlet plate 19 is provided with an aperture 26 constituting an inlet port. Aperture 26 is so positioned in plate 19 that in the course of the rotation of plate 19, aperture 26 will pass sequentially over passageways 21, 22 and 23. Outlet plate 20 is provided with an aperture 27 constituting a discharge port positioned 180° from inlet aperture 26 and similarly positioned with respect to passageways 21, 22 and 23 so as to rotate into discharge positions beneath these passageways.

FIGURE 5 illustrates additional details of the valve assembly of the present invention including the improved sealing means of the invention. As shown therein, inlet plate 19 is provided with an annular flange 28 surrounding and forming an extension of the inlet aperture 26. The trailing edge of flange 28 has an inwardly flaring configuration whereby the trailing edge of the inlet aperture through plate 19 is undercut to avoid chip binding. A downwardly extending wall portion 29 is secured around the circumference of plate 19. A drum head membrane 30 is connected to wall portion 29 and to an annular flange 31 surrounding shaft 18, 24. An axially extending bore 32 is rpovided in shaft 18. Bore 32 is connected to a high pressure fluid source (not shown) such as compressed air at a pressure higher than the operating pressure in digester 12, for example, in the order of 150 p.s.i.g. A radial bore 33 extends from the bore 32 into an enclosed chamber 34 defined by plate 19, wall portion 29, membrane 30, flange 31, and flange 28. The high pressure fluid entering through bores 32 and 33 presses membrane 30 down into tight sealing engagement with a bearing surface 35 secured to flange 13. The seal obtained in this manner is effective to prevent leakage from the digester 12 to the atmosphere even during high pressure cooking operations.

Outlet plate 20 is sealed with respect to the stationary portions of valve assembly 10 by means substantially similar to the sealing means for inlet plate 19. An annular flange 36 is secured to plate 20 and constitutes an extension of the discharge aperture 27. A circular wall portion 37 extends upwardly from plate 20. A membrane 38 is connected to the upper edge of wall portion 37, to flange 36, and to an annular flange 39 surrounding shaft 18. An enclosed chamber 40 formed in this manner beneath membrane 38 is connected to the high pressure fluid in axial bore 32 by a radial bore 41 extending through flange 39 and a portion of shaft 18. The introduction of high pressure fluid into chamber 40 via bores 32 and 41 presses membrane 38 into sealing engagement with a bearing surface 42 secured to the underside of flange 14 at the discharge ends of passageways 21, 22 and 23.

Membranes 30 and 38 preferably are made of light gage metal sheeting such as No. 10 gage steel reinforced by annular rings 30' and 38.'

Bearing surfaces 35 and 42 are laminated or made of hardened material to better withstand the friction generated during operation.

Figure 2:
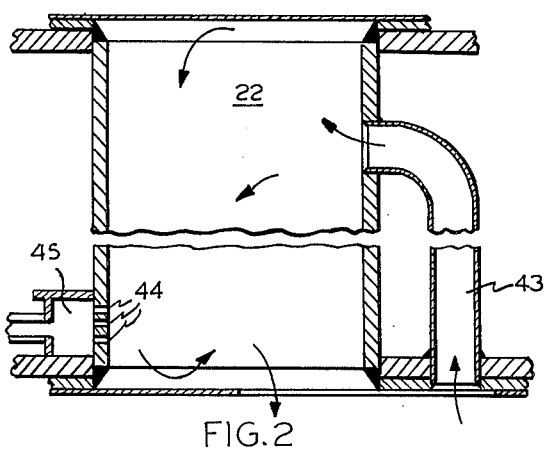
FIGURE 2 is a vertical sectional view showing details of a chip passageway taken substantially along line 2—2 of FIGURE 4.

FIGURE 2 shows a conduit 43 leading from the high pressure cooking zone into an upper portion of chip passageway 22. Identical conduits are associated with chip passageways 21 and 23. High pressure vapors in the digester enter conduits 43 only as the respective chip passageway comes into discharge position over discharge aperture 27. The vapor entering a passageway via conduit 43 assists to equalize the pressure in the passageway with that in the digester and aids in the discharge of all the chips from the several chip passageways.

In operation chips are swept from feed hopper 11 through aperture 26 in plate 19 and flange 28 into a respective chip passageway such as passageway 21 which is shown in the filling position in FIGURE 5. Perforations 44 adjacent the bottoms of passageways 21, 22 and 23 are provided for draining off excess liquor entering with the chips in order to assure uniform charging of each passageway. Valving 46 driven off the main shaft seals the drainage compartments 45 except when in filling position. Since inlet plate 19 and outlet plate 20 are rotated in unison by shaft 18, and since apertures 26 and 27 are offset with respect to each other, the lower end of passageway 21 will be sealed off by membrane 38 while chips are entering the upper end via aperture 26. As plates 19 and 20 rotate, the filling operation will be terminated and the upper end of passageway 21 will be closed off by membrane 30. Continued rotation of plates 19 and 20 will bring discharge aperture 27 beneath the now filled chip passageway 21. When this position in the cycle is reached, chips will be discharged into digester 12. At this time, vapor from digester 12 is being introduced into the upper portion of passageway 21 through conduit 43. This pressure equalizing vapor assists in the discharge of the chips through discharge aperture 27. After discharge, continued rotation of plates 19 and 20 will again bring inlet aperture 26 above passageway 21 to commence another cycle of operation.

During operation plates 19 and 20 are sealed with respect to the stationary portions of the valve assembly 10 primarily by means of membranes 30 and 38 which are pressed against bearing surfaces 35 and 42, respectively by high pressure fluid entering via bores 32, 33 and 41. The pressure behind membranes 30 and 38 is maintained higher than the operating pressure in the digester so that a very effective sealing is attained.

While one specific embodiment in accordance with the present invention has been shown and described, it is understood that the same is susceptible of many changes and modifications within the spirit of the present invention. For example, the chip passageways 21, 22 and 23 which are shown as substantially equally spaced about shaft 18 may be grouped closer together whereby drive means such as a bevel gear may engage shaft 18 intermediate plates 19 and 20. Similarly, more or fewer than three chip passageways may be provided if desired. It is also within the scope of the present invention to incorporate portions of the pressure equalizing conduit 43 within shaft 18 by providing a longitudinal bore therein and a header chamber surrounding shaft 18 in communication with the longitudinal bore. Accordingly, it is intended to cover all such changes and modifications as are encompassed by the appended claims.

I claim:
1. An improved material handling device for feeding material from a first region to a second region comprising, in combination, a first rotatable plate provided with an inlet port extending therethrough, a second rotatable plate spaced from said first rotatable plate and provided with a discharge port extending therethrough, drive means for rotating said first plate and said second plate, relatively fixed valve means forming a plurality of passageways positioned between said plates in sealing relationship therewith, said passageways each being sequentially in communication with said inlet port and said discharge port during rotation of said plates, and membrane means between at least one of said plates and said passageways, said membrane means being apertured for registry with the relative port and secured around the circumference thereof.

2. An improved material handling device for feeding material from a first region to a second region comprising, in combination, a first rotatable plate provided with an inlet port extending therethrough, a second rotatable plate spaced from said first rotatable plate and provided with a discharge port extending therethrough, drive means for rotating said first plate and said second plate, relatively fixed valve means forming a plurality of passageways positioned between said plates in sealing relationship therewith, said passageways each being sequentially in communication with said inlet port and said discharge port during rotation of said plates, and membrane means apertured for registry with the relative port between at least one of said plates and said passageways, said membrane means being thin metal sheeting and being secured around the circumference of the relative port.

3. An improved material handling device for feeding material from a first region to a second region comprising, in combination, a first rotatable plate provided with an inlet port extending therethrough, a second rotatable plate spaced from said first rotatable plate and provided with a discharge port extending therethrough, drive means for rotating said first plate and said second plate, relatively fixed valve means forming a plurality of passageways positioned between said plates in sealing relationship therewith, said passageways each being sequentially in communication with said inlet port and said discharge port during rotation of said plates, and membrane means apertured for registry with the relative port between at least one of said plates and said passageways, said membrane means being thin metal sheeting reinforced by rings annularly disposed with respect to the axis of rotation of said plates, said membrane means being secured around the circumference of the relative port.

4. An improved material handling device for feeding material from a first region to a second region comprising, in combination, a first rotatable plate provided with an inlet port extending therethrough, a second rotatable plate spaced from said first rotatable plate and provided with a discharge port extending therethrough, drive means for rotating said first plate and said second plate, relatively fixed valve means forming a plurality of passageways positioned between said plates in sealing relationship therewith, said passageways each being sequentially in communication with said inlet port and said discharge port during rotation of said plates, membrane means apertured for registry with the relative port between at least one of said plates and said passageways, and means to supply high pressure fluid against said membrane means, to press said membrane means into firmer sealing relationship against the proximal ends of said passageways.

5. In combination with a superatmospheric digester and chip supply means supplying chips for said digester, an improved chip feed device comprising a rotatable shaft, an inlet plate, and an outlet plate secured to said shaft and rotatable therewith, said inlet plate being provided with an inlet port to receive chips from said chip supply means, said outlet plate being provided with a discharge port peripherally offset with respect to said inlet port, fixed means including means defining a plurality of open ended passageways positioned between said plates and in bearing relationship with said plates, and drainage means associated with said passageways for draining off fluid entering along with chip feed, said drainage means including perforations adjacent the bottom of each said passageway, drainable drainage compartments for flow communication therewith, and valving for sealing said drainage compartments between fillings, whereby each of said passageways is sequentially filled with chips from said inlet port and discharged through said discharge port during rotation of said plates.

6. An improved material handling device for feeding material from a first region to a second region comprising, in combination, a first rotatable plate provided with an inlet port extending therethrough, a second rotatable plate spaced from said first rotatable plate and provided with a discharge port extending therethrough, drive means for rotating said first plate and said second plate in unison, said drive means being axially disposed with respect to said first and second plates and extending therebetween and stationary means constituting a plurality of passageways positioned between said plates in sealing relationship therewith, said passageways being sequentially in communication with said inlet port and said discharge port during rotation of said plates.

7. Apparatus as claimed in claim 6, wherein the trailing edge of said inlet port is undercut.

8. Apparatus for cooking wood chips or the like comprising a chip hopper, a digester, and feed valve means for introducing chips from said hopper into said digester, said feed valve means including a rotatable inlet plate provided with an inlet port extending therethrough, a rotatable outlet plate provided with an outlet port extending therethrough and offset with respect to said inlet port, and stator means having a plurality of passageways operatively positioned between said inlet plate and said outlet plate to sequentially receive chips passing through said aperture in said inlet plate and thereafter discharge the chips through said aperture in said outlet plate, means for equalizing the pressures in said digester and in said passageways during the discharge of chips therefrom, and sealing means including sheet metal membrane means apertured for registry with said ports between said plates and respective ends of said passageways, and biased into sealing engagement around the circumference thereof.

9. Apparatus for cooking wood chips or the like comprising a chip hopper, a digester, and feed valve means for introducing chips from said hopper into said digester, said feed valve means including a rotatable inlet plate provided with an inlet port extending therethrough, a rotatable outlet plate provided with an outlet port extending therethrough and offset with respect to said inlet port, stator means having a plurality of passageways operatively positioned between said inlet plate and said outlet plate to sequentially receive chips passing through said aperture in said inlet plate and thereafter discharged the chips through said aperture in said outlet plate, means for equalizing the pressures in said digester and in said passageways during the discharge of chips therefrom, membrane means apertured for registry with the relative port between at least one of said plates and said stator means, and means for supplying high pressure fluid against said membrane means to press said membrane means into firmer sealing engagement around the circumference of said passageways.

References Cited by the Examiner
UNITED STATES PATENTS

| | | | |
|---|---|---|---|
| 748,414 | 12/1903 | Passburg | 214—17 |
| 2,246,654 | 6/1941 | Arveson | 214—17 |
| 2,585,472 | 2/1952 | Kennedy. | |
| 2,933,208 | 4/1960 | Green. | |
| 3,020,019 | 2/1962 | Fawkes | 251—175 |
| 3,042,360 | 7/1962 | Sneddon | 251—175 |
| 3,080,074 | 3/1963 | Hornbostel | 214—17 |

HUGO O. SCHULZ, *Primary Examiner.*